(12) United States Patent
Wang et al.

(10) Patent No.: US 11,759,876 B2
(45) Date of Patent: Sep. 19, 2023

(54) PULSE DYNAMIC ELECTROCHEMICAL MACHINING APPARATUS AND METHOD FOR RAPIDLY LEVELING SURFACE OF REVOLVING PART

(71) Applicant: Nanjing University of Aeronautics and Astronautics, Nanjing (CN)

(72) Inventors: Dengyong Wang, Nanjing (CN); Guowei Cui, Nanjing (CN); Zengwei Zhu, Nanjing (CN); Di Zhu, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 17/872,459

(22) Filed: Jul. 25, 2022

(65) Prior Publication Data
US 2023/0036667 A1 Feb. 2, 2023

(30) Foreign Application Priority Data
Jul. 27, 2021 (CN) .......................... 202110849718.8

(51) Int. Cl.
*B23H 3/02* (2006.01)
*B23H 3/04* (2006.01)

(52) U.S. Cl.
CPC ................. *B23H 3/02* (2013.01); *B23H 3/04* (2013.01); *B23H 2300/10* (2013.01); *B23H 2300/12* (2013.01); *B23H 2400/10* (2013.01)

(58) Field of Classification Search
CPC ................................... B23H 3/00; B23H 3/02
See application file for complete search history.

(56) References Cited

U.S. PATENT DOCUMENTS

| 4,294,673 A | 10/1981 | Kimoto et al. |
| 2003/0006147 A1 | 1/2003 | Talieh |

FOREIGN PATENT DOCUMENTS

| CN | 205096663 U | 3/2016 |
| CN | 109277654 A | 1/2019 |
| CN | 110125499 A | 8/2019 |
| CN | 110153514 A | 8/2019 |

*Primary Examiner* — Nicholas A Smith
(74) *Attorney, Agent, or Firm* — CALDERON SAFRAN & COLE PC; Corinne Marie Pouliquen

(57) ABSTRACT

The invention relates to the technical field of electrochemical machining and provides a pulse dynamic electrochemical machining apparatus and method for rapidly leveling a surface of a revolving part. During rotating pulse dynamic electrochemical machining, a cathode tool rotates around a center point of the cathode tool at a constant angular velocity, and an anode workpiece rotates around a center point of the anode workpiece at the constant angular velocity; meanwhile, the cathode tool performs a feed movement at a set feed velocity along a center line of the cathode tool and the anode workpiece. A control system determines a machining voltage value output by a power source when each contour point of the anode workpiece rotates to a machining area to automatically change an applied voltage between the cathode tool and the anode workpiece.

20 Claims, 5 Drawing Sheets

PULSE DYNAMIC ELECTROCHEMICAL MACHINING APPARATUS AND METHOD FOR RAPIDLY LEVELING SURFACE OF REVOLVING PART

CROSS-REFERENCE TO RELATED APPLICATIONS AND CLAIM TO PRIORITY

This patent application claims the benefit and priority of Chinese Patent Application No. 202110849718.8, filed on Jul. 27, 2021, the disclosure of which is incorporated by reference herein in its entirety as part of the present application.

FIELD OF THE INVENTION

The disclosure relates to the technical field of electrochemical machining, and in particular, to a pulse dynamic electrochemical machining apparatus and method for rapidly leveling a surface of a revolving part.

BACKGROUND OF THE INVENTION

Electrochemical machining is a nontraditional machining method for removing materials based on the principle of electrochemical anodic dissolution. Compared with the traditional machining method, the electrochemical machining method is applicable to a wide range of materials and has high machining efficiency. Moreover, no cutting stress is produced during electrochemical machining such that the electrochemical machining method is suitable for machining thin-walled parts without tool wear. Therefore, the electrochemical machining method is applicable to thin-walled parts, complex curved surfaces, and hard-to-cut materials.

Casing parts are key components of an aeroengine and distributed at a plurality of positions of the aeroengine to support a rotor and fix a stator and connect units such as a control system, a fuel system, and a drive system together to form the entire aeroengine. Casing parts are mostly made of hard-to-cut materials such as super alloys and titanium alloys. At present, casing parts are commonly produced by traditional numerical control machining. However, due to the use of hard-to-cut materials and thin wall thickness, there are problems of long machining period, serious tool wear, and high machining cost. Meanwhile, the poor machinability of materials and residual stress produced during milling may result in severe deformation of casing parts during machining and hence poor wall thickness uniformity. To reduce the deformation of casing parts, a complex thermal treatment process has to be conducted.

SUMMARY OF THE INVENTION

To address the machining problem of thin-walled casing parts, Applicant developed a novel electrochemical machining method (referred to as a counter-rotating electrochemical machining method or CRECM) for use on the thin-walled casings of an aeroengine. In this method, a revolving tool electrode with hollow windows is used and rotates relatively with the anode workpiece at the same rotational speed in different directions. As the material is dissolved layer by layer in CRECM, it holds the advantage in principle of controlling machining deformation and wall thickness of the thin-walled revolving parts.

During counter-rotating electrochemical machining of a casing part, since the outer cylindrical surface of the revolving casing part workblank often has a certain roundness error, the inter-electrode gap may vary in size when each point of the surface of an anode workpiece rotates to a machining area, resulting in different dissolution rates at the surface of the anode workpiece. The leveling process of the outer cylindrical contour is slow, and a long transitional period under the conditions of given rotational angular velocity, initial inter-electrode gap and machining voltage is needed to reach the equilibrium state. This may affect the forming quality and the machining accuracy of the convex structures on the surface of the casing part.

One object of the invention is to improve the machining efficiency and machining accuracy of the rotating pulse dynamic electrochemical machining method, the time for leveling the outer cylindrical contour of the surface of an anode workpiece needs to be shortened so that a stable machining state can be achieved rapidly.

Another object of the invention is to meet the high efficiency and machining precision requirements on rotating pulse dynamic electrochemical machining, the disclosure provides a pulse dynamic electrochemical machining apparatus and method for rapidly leveling a surface of a revolving part.

These and other objects and features of the invention are accomplished among other things, by:

A pulse dynamic electrochemical machining apparatus for rapidly leveling a surface of a revolving part and includes a power source, a displacement sensor, and a control system.

The power source has a positive electrode connected to an anode workpiece and a negative electrode connected to a cathode tool.

The displacement sensor is configured to collect outer cylindrical contour data of the anode workpiece and transmit the outer cylindrical contour data to the control system. The outer cylindrical contour data includes a highest contour point, a lowest contour point, and consecutive contour points between the highest contour point and the lowest contour point, where the highest contour point corresponds to a maximum radius value, and the lowest contour point corresponds to a minimum radius value.

The control system is configured to determine a machining voltage value output by the power source when each contour point of the anode workpiece rotates to a machining area.

During rotating pulse dynamic electrochemical machining, the cathode tool rotates around a center point of the cathode tool at a constant angular velocity, and the anode workpiece rotates around a center point of the anode workpiece at the constant angular velocity; meanwhile, the cathode tool feeds at a constant feed velocity along the center line of the cathode tool and the anode workpiece. The control system determines the machining voltage value output by the power source when each contour point of the anode workpiece rotates to the machining area to automatically change the applied voltage between the cathode tool and the anode workpiece. The control system controls the power source to output a maximum voltage value when the highest contour point of the anode workpiece rotates to the machining area and controls the power source to output zero voltage value when the lowest contour point of the anode workpiece rotates to the machining area.

Alternatively, during rotating pulse dynamic electrochemical machining, the displacement sensor is configured to collect outer cylindrical contour data of the anode workpiece before the jth revolution of the anode workpiece; and the control system is configured to:

calculate a maximum roundness error based on the outer cylindrical contour data of the anode workpiece before the jth revolution of the anode workpiece;

determine whether the maximum roundness error is greater than a set tolerance value to obtain a determination result;

if the determination result indicates that the maximum roundness error is greater than a set tolerance value, calculate a machining voltage value output by the power source corresponding to each contour point during the jth revolution of the anode workpiece based on the maximum roundness error of each contour point, update the maximum roundness error in the step of determining whether the maximum roundness error is greater than a set tolerance value to obtain a determination result to a maximum roundness error corresponding to the (j+1)th revolution, and return to the step of determining whether the maximum roundness error is greater than a set tolerance value to obtain a determination result; and if the determination result indicates that the maximum roundness error is less than or equal to the set tolerance value, control the power source to output a constant machining voltage value.

Alternatively, in the method of calculating a maximum roundness error based on the outer cylindrical contour data of the anode workpiece before the jth revolution of the anode workpiece, the control system is configured to:

determine a maximum radius value and a minimum radius value in the outer cylindrical contour data of the anode workpiece before the jth revolution of the anode workpiece; and calculate a difference between the maximum radius value and the minimum radius value and determine the difference as the maximum roundness error.

Alternatively, in regard to calculating a machining voltage value output by the power source corresponding to each contour point during the jth revolution of the anode workpiece based on the maximum roundness error, the control system is configured to:

calculate a machining voltage value output by the power source corresponding to the ith contour point during the jth revolution of the anode workpiece by $$U_{ji} = \frac{\delta_{ji}}{\delta_{maxj}} U_{maxj},$$

where $U_{ji}$ represents the machining voltage value when the ith contour point of the anode workpiece rotates to the machining area during the jth revolution of the anode workpiece; $\delta_{ji}$ represents the radius difference between the ith contour point of the anode workpiece and the lowest contour point of the anode workpiece during the jth revolution of the anode workpiece; $\delta_{maxj}$ represents the maximum roundness error of the outer cylindrical contour of the anode workpiece during the jth revolution of the anode workpiece; and $U_{maxj}$ represents the maximum machining voltage applied to the anode workpiece during the jth revolution of the anode workpiece.

Alternatively, the machining voltage value corresponding to the highest contour point of the anode workpiece gradually decreases with an increasing number of revolutions of the anode workpiece.

Alternatively, the pulse dynamic electrochemical machining apparatus further includes a electrolyte tank.

The cathode tool and the anode workpiece may be both immersed in the electrolyte tank for electrochemical machining.

The displacement sensor may be installed on one side of the electrolyte tank and close to the anode workpiece.

Alternatively, the pulse dynamic electrochemical machining apparatus further includes an oscilloscope.

The oscilloscope may be connected to the displacement sensor.

The oscilloscope may be configured to acquire the outer cylindrical contour data of the anode workpiece collected by the displacement sensor and display the acquired data in a graphic form.

The cathode tool may have a revolving part structure; and the anode workpiece may have a revolving part structure.

A pulse dynamic electrochemical machining method for rapidly leveling a surface of a revolving part includes the following steps:

during rotating pulse dynamic electrochemical machining, collecting outer cylindrical contour data of the anode workpiece before the jth revolution of the anode workpiece;

calculating a maximum roundness error based on the outer cylindrical contour data of the anode workpiece before the jth revolution of the anode workpiece;

determining whether the maximum roundness error is greater than a set tolerance value to obtain a determination result;

if the determination result indicates that the maximum roundness error is greater than a set tolerance value, calculating a machining voltage value output by the power source corresponding to each contour point during the jth revolution of the anode workpiece based on the maximum roundness error, updating the maximum roundness error in the step of determining whether the maximum roundness error is greater than a set tolerance value to obtain a determination result to a maximum roundness error corresponding to the (j+1)th revolution, and returning to the step of determining whether the maximum roundness error is greater than a set tolerance value to obtain a determination result; and if the determination result indicates that the maximum roundness error is less than or equal to the set tolerance value, controlling the power source to output a constant machining voltage value.

Alternatively, the calculating a maximum roundness error based on the outer cylindrical contour data of the anode workpiece before the jth revolution of the anode workpiece specifically includes:

determining a maximum radius value and a minimum radius value in the outer cylindrical contour data of the anode workpiece before the jth revolution of the anode workpiece; and calculating a difference between the maximum radius value and the minimum radius value and determining the difference as the maximum roundness error.

Alternatively, the machining voltage value output by the power source corresponding to each contour point during the jth revolution of the anode workpiece based on the maximum roundness error specifically includes:

calculating the machining voltage value output by the power source corresponding to the ith contour point during the jth revolution of the anode workpiece by $$U_{ji} = \frac{\delta_{ji}}{\delta_{maxj}} U_{maxj},$$

where $U_{ji}$ represents a machining voltage value when the ith contour point of the anode workpiece rotates to the machining area during the jth revolution of the anode workpiece; $\delta_{ji}$ represents a radius difference between the ith contour point of the anode workpiece and the lowest contour point of the anode workpiece during the jth revolution of the anode workpiece; $\delta_{maxj}$ represents the maximum roundness error of the outer cylindrical contour of the anode workpiece during the jth revolution of the anode workpiece; and $U_{maxj}$ represents a maximum machining voltage applied to the anode workpiece during the jth revolution of the anode workpiece.

According to the specific examples provided in the disclosure, the disclosure discloses the following technical effects:

The disclosure provides a pulse dynamic electrochemical machining apparatus and method for rapidly leveling a surface of a revolving part. According to the method, during pulse dynamic electrochemical machining, the outer cylindrical contour data of the anode workpiece is collected in real time and input to the control system to automatically change the machining voltage value output by a power source. When a high contour point of the anode workpiece rotates to a machining area, the power source is switched on to realize high point dissolved electrochemically, which means that the materials of the high contour point will dissolute. When the lowest contour point of the anode workpiece rotates to the machining area, the power source outputs zero voltage such that only the material at the high contour point is corroded during pulse dynamic electrochemical machining. In other words, with given inter-electrode gap, cathode tool feed velocity (i.e., a set feed velocity), electrolyte conductivity and rotational angular velocity (i.e., a constant angular velocity), the voltage value corresponding to each contour point of the anode workpiece is derived according to a theoretical equation based on the outer cylindrical contour data of the anode workpiece, and the power source is controlled by the control system to output a corresponding voltage waveform. The disclosure allows for significant shortening of the transition time of the pulse dynamic electrochemical machining, achieves the purpose of rapidly leveling the outer cylindrical contour of the surface of an anode workpiece, and makes the pulse dynamic electrochemical machining stable rapidly, thereby guaranteeing the stability and high efficiency of the pulse dynamic electrochemical machining and also guaranteeing the consistency of the minimum inter-electrode gap of the rotating pulse dynamic electrochemical machining. Thus, the surface quality and machining precision of the convex structures on a casing part after the completion of pulse dynamic electrochemical machining method can be improved.

BRIEF DESCRIPTION OF THE DRAWINGS

To describe the technical solutions in examples of the disclosure or in the prior art more clearly, the accompanying drawings required in the examples will be briefly described below. Apparently, the accompanying drawings in the following description show merely some examples of the disclosure, and other drawings can be derived from the accompanying drawings by those of ordinary skill in the art without creative efforts.

Figure 1:
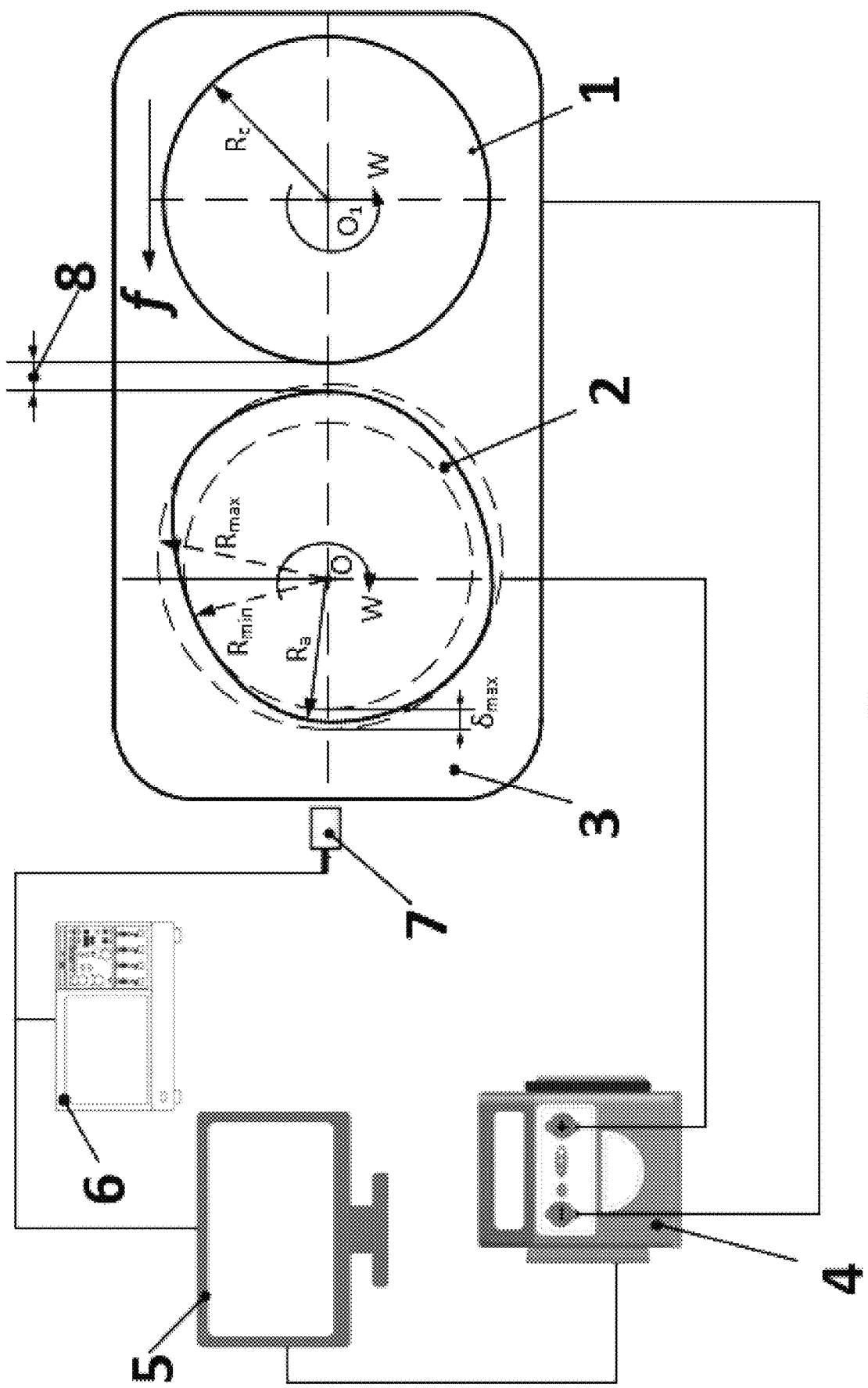
FIG. 1 is a structural schematic diagram of a pulse dynamic electrochemical machining method for rapidly leveling surface of revolving part according to the disclosure.

List of Reference Numerals: 1—cathode tool, 2—anode workpiece, 3—electrolyte tank, 4—power source, 5—control system, 6—oscilloscope, 7—displacement sensor, and 8—inter-electrode gap.

DETAILED DESCRIPTION OF THE PREFERRED EMBODIMENTS

The technical solutions in examples of the disclosure will be described below clearly and completely with reference to the accompanying drawings in the examples of the disclosure. Apparently, the described examples are merely some rather than all of the examples of the disclosure. All other examples obtained by a person of ordinary skill in the art based on the examples of the disclosure without creative efforts shall fall within the protection scope of the disclosure.

To make the above-mentioned objective, features, and advantages of the disclosure clearer and more comprehensible, the disclosure will be further described in detail below in conjunction with the accompanying drawings and specific embodiments.

The disclosure provides a pulse dynamic electrochemical machining apparatus and method for rapidly leveling the surface of a revolving part, which are intended to collect the outer cylindrical contour data of the anode workpiece in real time, indirectly derive the voltage value required to eliminate the roundness error between any contour point and the lowest contour point of the anode workpiece based on the collected data in conjunction with a theoretical equation, and control a power source by a control system to output corresponding voltage values when the arbitrary contour points rotate to the machining area. When the highest contour point of the anode workpiece rotates to the machining area, the power source outputs a maximum machining voltage value to realize maximum corrosion of the highest contour point of the anode workpiece. When the lowest contour point of the anode workpiece rotates to the machining area, the power source outputs zero machining voltage value to realize maximum corrosion of the highest contour point of the anode workpiece to avoid dissolution of the material at the lowest contour point of the anode workpiece. The purpose of making pulse dynamic electrochemical machining stable rapidly is achieved, and the consistency of the minimum inter-electrode gap of the rotating pulse dynamic electrochemical machining is guaranteed. Thus, the surface quality and machining accuracy of the casing part with some convex structures after the completion of pulse dynamic electrochemical machining can be improved, and the machining efficiency can also be improved.

EXAMPLE 1

Referring to FIG. 1, a pulse dynamic electrochemical machining apparatus for rapidly leveling a surface of a revolving part provided in this example includes a power source 4, a displacement sensor 5, and a control system 7.

The power source 4 has a positive electrode connected to the anode workpiece 2 and a negative electrode connected to the cathode tool 1. The cathode tool 1 is a revolving part structure, and the anode workpiece 2 is also a revolving part structure. The anode workpiece 2 has a certain roundness error $\delta_{max}$ in the outer cylindrical contour thereof under the initial condition.

The displacement sensor 7 is configured to collect outer cylindrical contour data of the anode workpiece 2 and transmit the outer cylindrical contour data to the control system 5. The outer cylindrical contour data includes a highest contour point, a lowest contour point, and consecutive contour points between the highest contour point and the lowest contour point, where the highest contour point corresponds to a maximum radius value, and the lowest contour point corresponds to a minimum radius value.

The control system 5 is configured to determine the machining voltage value output by the power source 4 when each contour point of the anode workpiece 2 rotates to the machining area.

During pulse dynamic electrochemical machining, the cathode tool 1 is connected to the negative electrode of the power source 4, and the anode workpiece 2 is connected to the positive electrode of the power source 4. The cathode tool 1 rotates around the center point $O_1$ of the cathode tool at a constant angular velocity, and the anode workpiece 2 rotates around the center point O of the anode workpiece at the constant angular velocity; meanwhile, the cathode tool 1 feeds at a constant feed velocity along the center line of the cathode tool 1 and the anode workpiece 2. The control system 5 determines the machining voltage value output by the power source when each contour point of the anode workpiece 2 rotates to the machining area to automatically change the applied voltage between the cathode tool 1 and the anode workpiece 2. The control system 5 controls the power source 4 to output a maximum voltage value when the highest contour point of the anode workpiece 2 rotates to the machining area and controls the power source 4 to output zero voltage value when the lowest contour point of the anode workpiece 2 rotates to the machining area.

As a preferred embodiment, the electrochemical machining apparatus described in this example further includes a electrolyte tank 3. The cathode tool 1 and the anode workpiece 2 are both immersed in the electrolyte tank 3 for electrochemical machining.

Further, the displacement sensor 7 is installed on one side of the electrolyte tank 3 and close to the anode workpiece 2.

As a preferred embodiment, the electrochemical machining apparatus described in this example further includes an oscilloscope 6. The oscilloscope 6 is connected to the displacement sensor 7. The oscilloscope 6 is configured to acquire the outer cylindrical contour data of the anode workpiece 2 collected by the displacement sensor 7 and display the acquired data in a graphic form.

As a preferred embodiment, the electrochemical machining apparatus described in this example further includes a flexible metal tubing. During pulse dynamic electrochemical machining, the flexible metal tubing supplies a liquid to the inter-electrode gap 8 between the cathode tool 1 and the anode workpiece 2. The flow rate and pressure of liquid supply from the flexible metal tubing can be adjusted according to actual machining conditions.

As a preferred embodiment, the displacement sensor 7 described in this example is a contact or non-contact displacement sensor.

As a preferred embodiment, in this example, in combination with the practical electrochemical machining process, the voltage $U_{maxj}$ output by the power source 4 is usually 30 V to 50 V.

As a preferred embodiment, the displacement sensor 7 described in this example is configured to collect the outer cylindrical contour data of the anode workpiece 2, and discretize and transmit the outer cylindrical contour data to the control system 5.

The control system 1 is configured to calculate the voltage value of the power source 4 corresponding to the outer cylindrical contour in the machining area at each time by an equation based on the discretized outer cylindrical contour data to automatically change the applied voltage between the cathode tool 1 and the anode workpiece 2.

Further, the operating process of the pulse dynamic electrochemical machining apparatus for rapidly leveling a surface of a revolving part is described below.

The displacement sensor 7 performs pre-detection to obtain the outer cylindrical contour of the anode workpiece before energization, and then a corresponding voltage waveform is obtained in conjunction with the corresponding theoretical equation for electrochemical machining.

Step 1, before the start of electrochemical machining (i.e., before energization), the displacement sensor 7 is installed on one side of the electrolyte tank 3, performs pre-detection to obtain the outer cylindrical contour data of the anode workpiece 2, from which the roundness error $\delta_{max1}$ of the outer cylindrical contour of the anode workpiece 2 can be obtained, and transmits the outer cylindrical contour data to the control system 5.

Step 2, after the start of electrochemical machining, the electrolyte flows through the inter-electrode gap 8 between the cathode tool 1 and the anode workpiece 2 at a high speed to take away the product of machining in time, ensuring that the electrolyte conductivity is appropriately constant. Meanwhile, the electrolyte gradually fills the electrolyte tank 3 for electrochemical machining. The cathode tool 1 is connected to the negative electrode of the power source 4, and the anode workpiece 2 is connected to the positive electrode of the power source 4. The cathode tool 1 and the anode workpiece 2 rotate around their respective center points $O_1$ and O at a certain angular velocity, while the cathode tool 1 feeds at a constant feed velocity f along the center line of the cathode tool 1 and the anode workpiece 2.

Step 3, based on the outer cylindrical contour data of the anode workpiece 2 detected by the displacement sensor 7, the anode workpiece 2 makes a rotational motion during pulse dynamic electrochemical machining. When the anode workpiece 2 rotates, the power source 4 outputs the maximum voltage value when the highest contour point of the anode workpiece 2 rotates to the machining area in each revolution, and the corrosion is maximum at this time. The power source 4 outputs the minimum voltage value when the lowest contour point of the anode workpiece 2 rotates to the machining area in each revolution, and the corrosion is minimum at this time, which can be approximated as no dissolution occurring for the material of the anode workpiece 2. Thus, the purpose of rapidly leveling the outer cylindrical contour of the surface of the anode workpiece can be achieved. This process is described below in detail.

During pulse dynamic electrochemical machining and in the first revolution of the anode workpiece 2, when the highest contour point $A_{max}$ of the anode workpiece 2 rotates to the machining area, the roundness error $\delta_{max1}$ is calculated based on the detected outer cylindrical contour data. The control system 5, based on the roundness error $\delta_{max1}$, controls the power source 4 to output the machining voltage $U_{1max}=U_{max1}$. When the lowest contour point $A_{min}$ of the anode workpiece 2 rotates to the machining area, the control system 5 controls the power source 4 to output the machining voltage $U_{1min}=0$. When any contour point $A_i$ of the anode workpiece 2 rotates to the machining area, the control system 5 controls the power source 4 to output the machining voltage:

$$U_{1i} = \frac{\delta_{1i}}{\delta_{max1}} U_{max1}.$$

In particular, $U_{1i}$ is a machining voltage when any contour point of the anode workpiece 2 rotates to the machining area during the first revolution of the anode workpiece 2; $\delta_{1i}$ is a radius difference between any contour point of the anode workpiece 2 and the lowest contour point of the anode workpiece 2 during the first revolution of the anode workpiece 2; $\delta_{max1}$ is the maximum roundness error of the outer cylindrical contour of the anode workpiece 2 during the first revolution of the anode workpiece 2; and $U_{max1}$ is a maximum machining voltage applied to the anode workpiece 2 during the first revolution of the anode workpiece 2. The maximum roundness error is calculated through a process including collecting, before the first revolution of the anode workpiece 2, the outer cylindrical contour data of the anode workpiece 2 by means of the displacement sensor 7, and calculating the maximum roundness error based on the maximum radius value and the minimum radius value in the outer cylindrical contour data. As mentioned here, the maximum roundness error is the difference between the maximum radius value and the minimum radius value.

By the above equation, the waveform $U_1$ of the machining voltage during the rotating pulse dynamic electrochemical machining and in the first revolution of the anode workpiece 2 can be obtained.

During the rotating pulse dynamic electrochemical machining and in the second revolution of the anode workpiece 2, when the highest contour point $B_{max}$ of the anode workpiece 2 rotates to the machining area, the roundness error $\delta_{max2}$ is calculated based on the detected outer cylindrical contour data. The control system 5, based on the roundness error $\delta_{max2}$, controls the power source 4 to output the machining voltage $U_{2max}=U_{max2}$. When the lowest contour point $B_{min}$ of the anode workpiece 2 rotates to the machining area, the control system 5 controls the power source 4 to output the machining voltage $U_{2min}=0$. When any contour point $B_i$ of the anode workpiece 2 rotates to the machining area, the control system 5 controls the power source 4 to output the machining voltage:

$$U_{2i} = \frac{\delta_{2i}}{\delta_{max2}} U_{max2}.$$

In particular, $U_{2i}$ is a machining voltage when any contour point of the anode workpiece 2 rotates to the machining area during the second revolution of the anode workpiece 2; $\delta_{2i}$ is a radius difference between any contour point of the anode workpiece 2 and the lowest contour point of the anode workpiece 2 during the second revolution of the anode workpiece 2; $\delta_{max2}$ is the maximum roundness error of the outer cylindrical contour of the anode workpiece 2 during the second revolution of the anode workpiece 2; and $U_{max2}$ is a maximum machining voltage applied to the anode workpiece 2 during the second revolution of the anode workpiece 2. Here, the maximum roundness error is calculated through a process including collecting, before the second revolution of the anode workpiece 2, the outer cylindrical contour data of the anode workpiece 2 by means of the displacement sensor 7, and calculating the maximum roundness error based on the maximum radius value and the minimum radius value in the outer cylindrical contour data. As mentioned here, the maximum roundness error is the difference between the maximum radius value and the minimum radius value.

By the above equation, the waveform $U_2$ of the machining voltage during the pulse dynamic electrochemical machining and in the second revolution of the anode workpiece 2 can be obtained.

By parity of reasoning, during the rotating pulse dynamic electrochemical machining and in the jth revolution of the anode workpiece 2, when the highest contour point $C_{max}$ of the anode workpiece 2 rotates to the machining area, the roundness error $\delta_{maxj}$ is calculated based on the detected outer cylindrical contour data. The control system 5, based on the roundness error δmaxj, controls the power source 4 to output the machining voltage $U_{jmax}=U_{maxj}$. When the lowest contour point $C_{min}$ of the anode workpiece 2 rotates to the machining area, the control system 5 controls the power source 4 to output the machining voltage $U_{jmin}=0$. When any contour point $C_i$ of the anode workpiece 2 rotates to the machining area, the control system 5 controls the power source 4 to output the machining voltage:

$$U_{ji} = \frac{\delta_{ji}}{\delta_{maxj}} U_{maxj}.$$

In particular, $U_{ji}$ is a machining voltage when any contour point of the anode workpiece 2 rotates to the machining area during the jth revolution of the anode workpiece 2; $\delta_{ji}$ is a radius difference between any contour point of the anode workpiece 2 and the lowest contour point of the anode workpiece 2 during the jth revolution of the anode workpiece 2; $\delta_{maxj}$ is the maximum roundness error of the outer cylindrical contour of the anode workpiece 2 during the jth revolution of the anode workpiece 2; and $U_{maxj}$ is a maximum machining voltage applied to the anode workpiece 2 during the jth revolution of the anode workpiece 2. The maximum roundness error is calculated through a process including collecting, before the jth revolution of the anode workpiece 2, the outer cylindrical contour data of the anode workpiece 2 by means of the displacement sensor 7, and calculating the maximum roundness error based on the maximum radius value and the minimum radius value in the outer cylindrical contour data. As mentioned here, the maximum roundness error is the difference between the maximum radius value and the minimum radius value.

By the above equation, the waveform $U_j$ of the machining voltage during the rotating pulse dynamic electrochemical machining and in the jth revolution of the anode workpiece 2 can be obtained.

During the rotating pulse dynamic electrochemical machining and in the nth revolution of the anode workpiece 2, when the maximum roundness error $\delta_{maxn}$ is less than or equal to a set tolerance value $\delta_{error}$, it is believed that the anode workpiece 2 has been leveled, and a constant voltage value U is adopted for the rotating pulse dynamic electrochemical machining at this time.

The set tolerance value $\delta_{error}$ is generally 0.01 mm. In other words, when $\delta_{maxn}$ is less than or equal to 0.01 mm, it is believed that the anode workpiece 2 has been leveled.

In view of this, during the rotating pulse dynamic electrochemical machining, the displacement sensor 7 is configured to collect the outer cylindrical contour data of the anode workpiece 2 before the jth revolution of the anode workpiece.

The control system 5 is configured to:

calculate the maximum roundness error based on the outer cylindrical contour data of the anode workpiece 2 before the jth revolution of the anode workpiece 2;

determine whether the maximum roundness error is greater than the set tolerance value to obtain a determination result;

if the determination result indicates that the maximum roundness error is greater than the set tolerance value, calculate the machining voltage value output by the power source corresponding to each contour point during the jth revolution of the anode workpiece based on the maximum roundness error (i.e., calculate the waveform of the machining voltage output by the power source during the jth revolution of the anode workpiece based on the maximum roundness error), update the maximum roundness error in the step of determining whether the maximum roundness error is greater than a set tolerance value to obtain a determination result to a maximum roundness error corresponding to the (j+1)th revolution, and return to the step of determining whether the maximum roundness error is greater than a set tolerance value to obtain a determination result, where the control system 5 controls the power source 4 to output the maximum voltage value when the highest contour point of the anode workpiece 2 rotates to the machining area and controls the power source 4 to output zero voltage value when the lowest contour point of the anode workpiece 2 rotates to the machining area; and if the determination result indicates that the maximum roundness error is less than or equal to the set tolerance value, control the power source to output a constant machining voltage value.

Further, in regard to calculating the maximum roundness error based on the outer cylindrical contour data of the anode workpiece 2 before the jth revolution of the anode workpiece 2, the control system 5 is configured to:

determine the maximum radius value and the minimum radius value in the outer cylindrical contour data of the anode workpiece 2 before the jth revolution of the anode workpiece 2; and calculate the difference between the maximum radius value and the minimum radius value and determine the difference as the maximum roundness error.

Further, in regard to calculating the machining voltage value output by the power source corresponding to each contour point during the jth revolution of the anode workpiece based on maximum roundness error, the control system 5 is configured to:

calculate the machining voltage value output by the power source corresponding to the ith contour point during the jth revolution of the anode workpiece by $$U_{ji} = \frac{\delta_{ji}}{\delta_{maxj}} U_{maxj},$$

where $U_{ji}$ represents a machining voltage value when the ith contour point of the anode workpiece 2 rotates to the machining area during the jth revolution of the anode workpiece 2; $\delta_{ji}$ represents a radius difference between the ith contour point of the anode workpiece 2 and the lowest contour point of the anode workpiece 2 during the jth revolution of the anode workpiece 2; $\delta_{maxj}$ represents the maximum roundness error of the outer cylindrical contour of the anode workpiece 2 during the jth revolution of the anode workpiece 2; and $U_{maj}$ represents a maximum machining voltage applied to the anode workpiece 2 during the jth revolution of the anode workpiece 2.

Further, the machining voltage value corresponding to the highest contour point of the anode workpiece 2 gradually decreases with an increasing number of revolutions of the anode workpiece 2.

The maximum machining voltage values in this example are determined according to actual process requirements.

Figure 2:
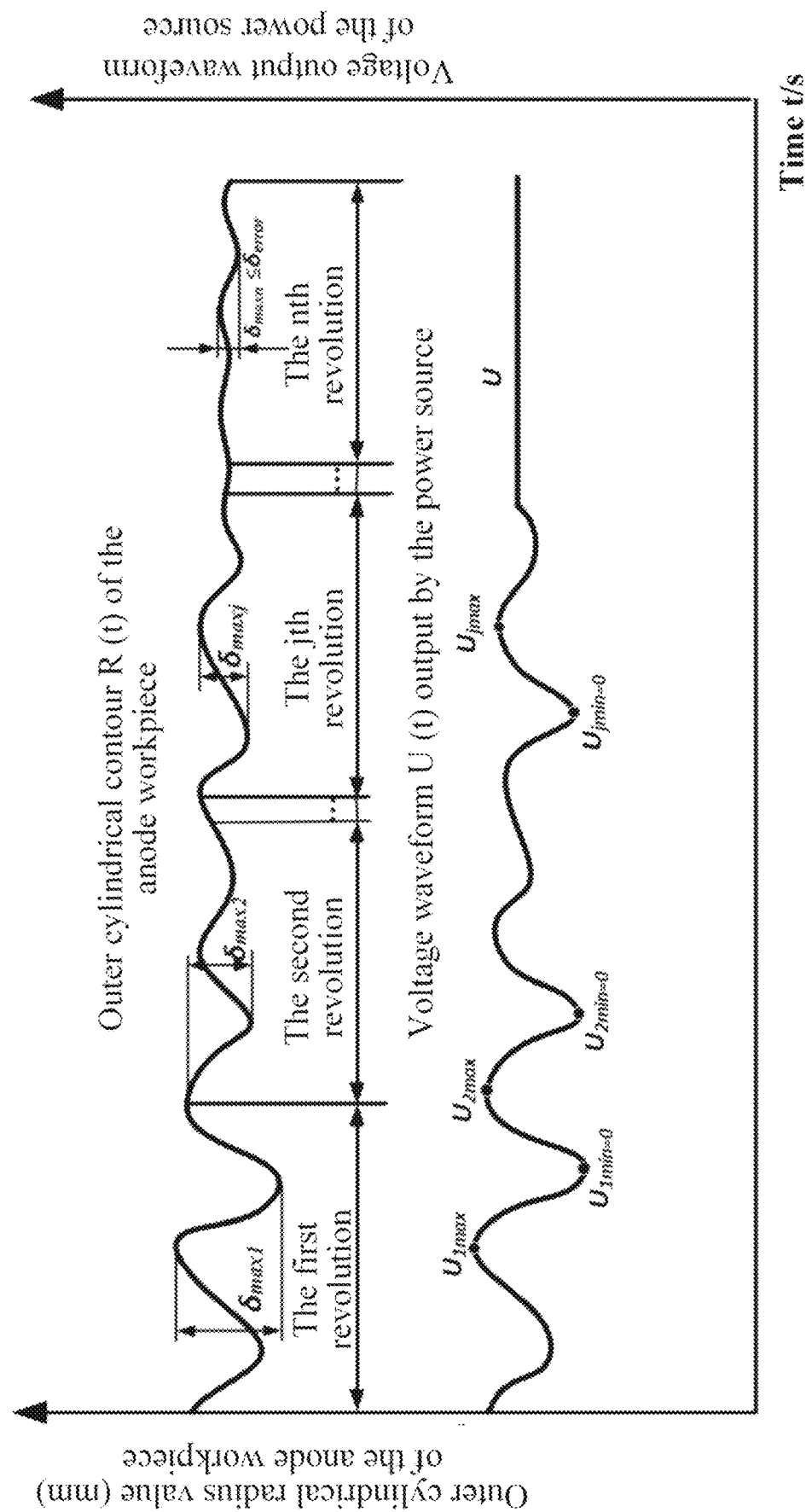
FIG. 2 is a schematic diagram of a voltage waveform of a power source based on roundness errors of the anode workpiece according to the disclosure.

As shown in FIG. 2, during the pulse dynamic electrochemical machining, the corresponding machining voltage waveform is derived from the outer cylindrical contour data of the anode workpiece 2 detected by the displacement sensor 7 in conjunction with the certain theoretical equation, and the control system 5 then controls the power source 4 to output this voltage waveform. Specifically, a large voltage is applied for the highest contour point of the anode workpiece 2 to cause maximum corrosion of the material, while zero voltage is applied for the lowest contour point to cause no dissolution of the material. Meanwhile, the anode workpiece 2 and the cathode tool 1 rotate about their respective center points O and $O_1$ at a constant angular velocity W, and the cathode tool 1 feeds at a constant feed velocity f along the center line of the cathode tool 1 and the anode workpiece 2. Thus, the material of the anode workpiece 2 is gradually dissolved and rounded along with the feed of the cathode tool 1.

Figure 3:
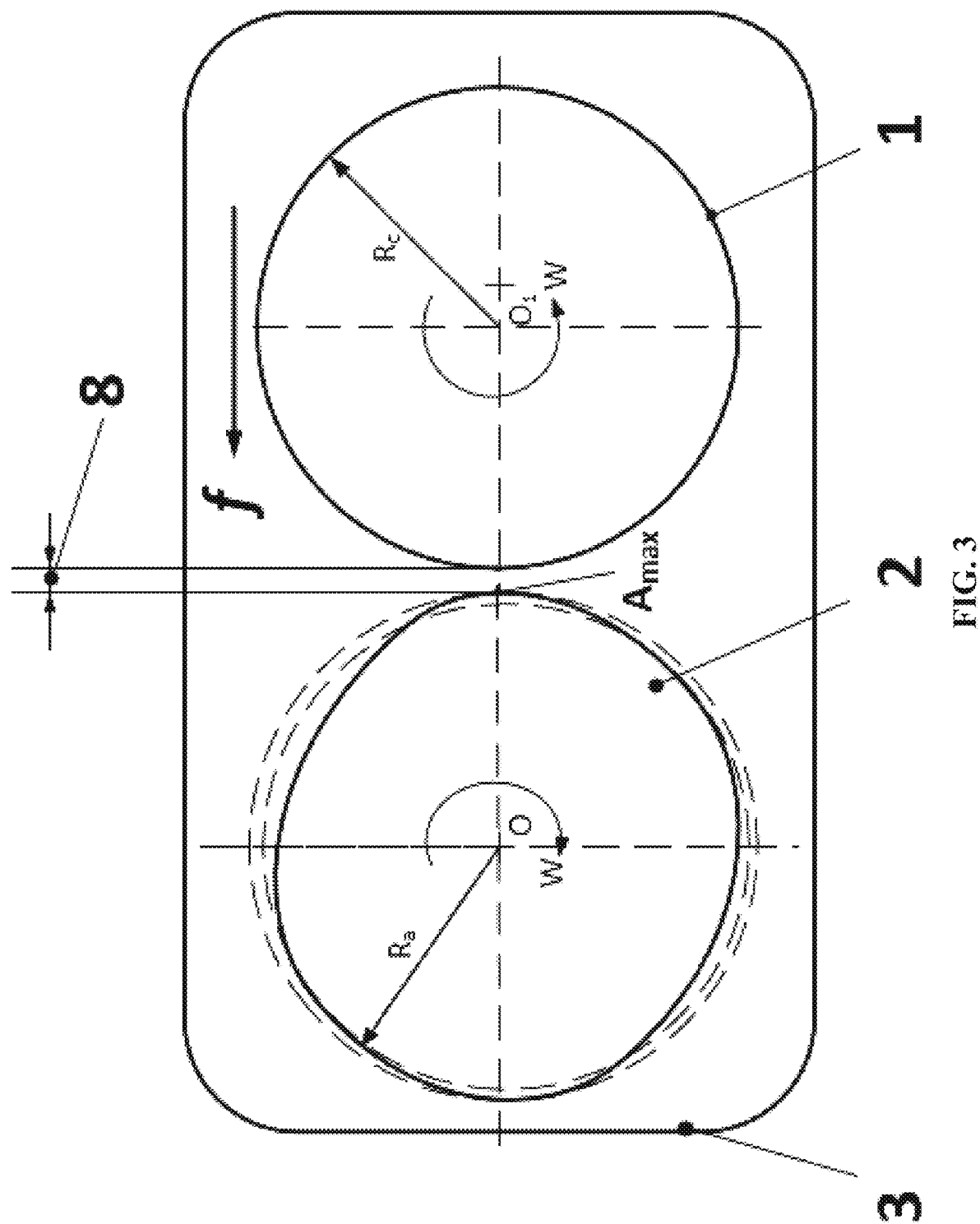
FIG. 3 is a schematic diagram illustrating that the highest contour point of the anode workpiece rotates to the machining area during rotating pulse dynamic electrochemical machining according to the disclosure.

As shown in FIG. 3, during the pulse dynamic electrochemical machining, when the highest contour point $A_{max}$ of the surface of the anode workpiece 2 rotates to the machining area, the power source 4 outputs the maximum voltage value at this time to cause the maximum corrosion of the material on the surface of the anode workpiece 2. Thus, the purpose of rapidly leveling the anode workpiece can be achieved.

Figure 4:
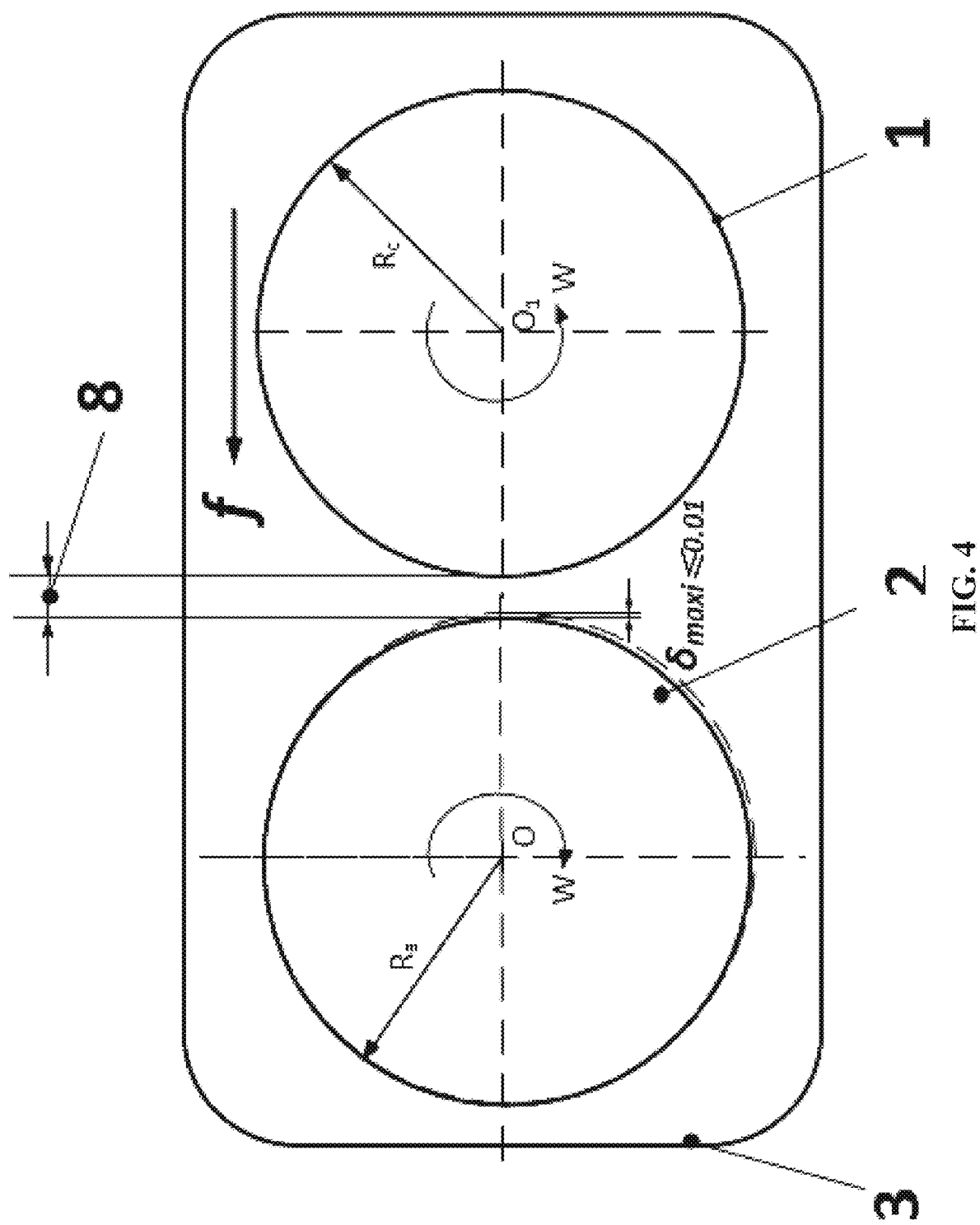
FIG. 4 is a schematic diagram illustrating ending of leveling of rotating pulse dynamic electrochemical machining according to the disclosure.

As shown in FIG. 4, as time goes on with the pulse dynamic electrochemical machining, the surface material of the anode workpiece 2 is gradually dissolved such that the surface roundness is gradually corrected. During the pulse dynamic electrochemical machining and in the jth revolution of the anode workpiece 2, if the surface roundness error $\delta_{maxj}$ of the anode workpiece 2 is less than or equal to 0.01 mm, it is believed that the surface contour has been leveled, and the machining voltage value output by the power source 4 can then be adjusted to a fixed value U to guarantee stable electrochemical machining, thereby guaranteeing stable and efficient pulse dynamic electrochemical machining. Meanwhile, the dimensional precision and the form accuracy of the anode workpiece after the completion of electrochemical machining can be improved.

EXAMPLE 2

Figure 5:
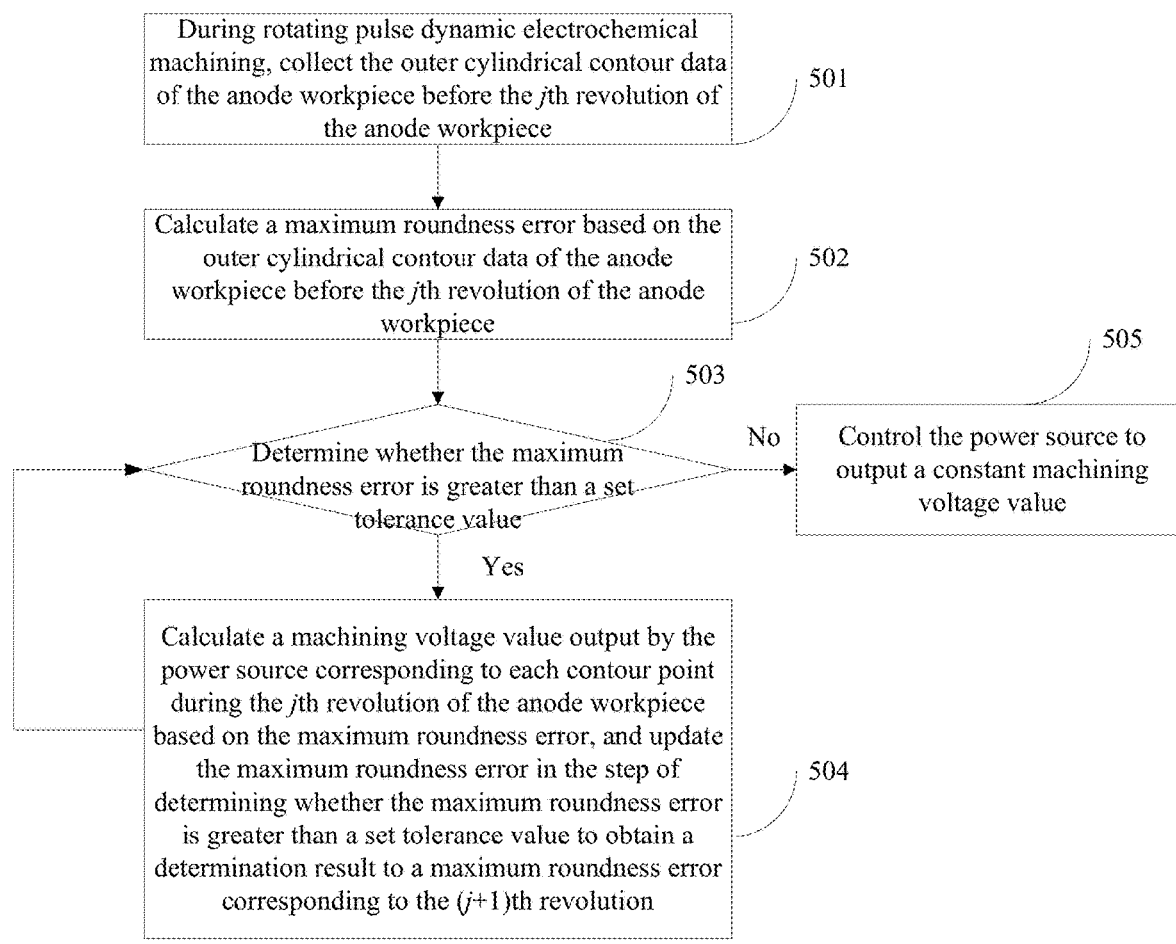
FIG. 5 is a flowchart of the pulse dynamic electrochemical machining method for rapidly leveling surface of revolving part according to the disclosure.

With reference to FIG. 5, a pulse dynamic electrochemical machining method for rapidly leveling a surface of a revolving part provided in this example includes:

Step 501: during pulse dynamic electrochemical machining, collect the outer cylindrical contour data of the anode workpiece before the jth revolution of the anode workpiece.

Step 502: calculate the maximum roundness error based on the outer cylindrical contour data of the anode workpiece before the jth revolution of the anode workpiece.

Step 503: determine whether the maximum roundness error is greater than the set tolerance value to obtain a determination result. If the determination result indicates that the maximum roundness error is greater than the set tolerance value, step 504 is performed. If the determination result indicates that the maximum roundness error is less than or equal to the set tolerance value, step 505 is performed.

Step 504: calculate a machining voltage value output by the power source corresponding to each contour point during the jth revolution of the anode workpiece based on the maximum roundness error, update the maximum roundness error in the step of determining whether the maximum roundness error is greater than a set tolerance value to obtain a determination result to a maximum roundness error corresponding to the (j+1)th revolution, and return to step 503.

Step 505: control the power source to output a constant machining voltage value.

After step 505, the displacement sensor may be stopped from working.

Step 502 specifically includes:

determine a maximum radius value and a minimum radius value in the outer cylindrical contour data of the anode workpiece before the jth revolution of the anode workpiece; and calculate a difference between the maximum radius value and the minimum radius value and determine the difference as the maximum roundness error.

The step of calculating a machining voltage value output by the power source corresponding to each contour point during the jth revolution of the anode workpiece based on the maximum roundness error specifically includes:

calculate a machining voltage value output by the power source corresponding to the ith contour point during the jth revolution of the anode workpiece by $$U_{ji} = \frac{\delta_{ji}}{\delta_{maxj}} U_{maxj},$$

where $U_{ji}$ represents a machining voltage value when the ith contour point of the anode workpiece rotates to the machining area during the jth revolution of the anode workpiece; $\delta_{ji}$ represents a radius difference between the ith contour point of the anode workpiece and the lowest contour point of the anode workpiece during the jth revolution of the anode workpiece; $\delta_{maxj}$ represents the maximum roundness error of the outer cylindrical contour of the anode workpiece during the jth revolution of the anode workpiece; and $U_{maxj}$ represents a maximum machining voltage applied to the anode workpiece during the jth revolution of the anode workpiece.

In the disclosure, the displacement sensor detects the outer cylindrical contour of the anode workpiece during the dynamic electrochemical machining in real time, and the control system controls the power source to output corresponding voltage signals based on the roundness error between two contour points in conjunction with a certain theoretical equation. In other words, the power source outputs the maximum voltage value when the highest contour point of the anode workpiece rotates to the machining area and outputs zero voltage value when the lowest contour point of the anode workpiece rotates to the machining area. The transition time of the rotating pulse dynamic electrochemical machining is shortened by changing the voltage, making the machining stable rapidly. Moreover, the surface quality and forming precision of a lug boss on a casing part during counter-rotating electrochemical machining can be significantly improved.

The examples of the present specification are described in a progressive manner. Each example focuses on the difference from other examples, and the same and similar parts between the examples may refer to each other. Since the system disclosed in an example corresponds to the method disclosed in another example, the description is relatively simple, and reference can be made to the method description.

Specific examples are used herein to explain the principles and embodiments of the disclosure. The foregoing description of the examples is merely intended to help understand the method of the disclosure and its core ideas; besides, various modifications may be made by a person of ordinary skill in the art to specific embodiments and the scope of application in accordance with the ideas of the disclosure. In conclusion, the contents of the present description shall not be construed as limitations to the disclosure.

What is claimed is:

1. A pulse dynamic electrochemical machining apparatus for rapidly leveling a surface of a revolving part, comprising a power source, a displacement sensor, and a control system, wherein the power source has a positive electrode connected to an anode workpiece and a negative electrode connected to a cathode tool;

the displacement sensor is configured to collect outer cylindrical contour data of the anode workpiece and transmit the outer cylindrical contour data to the control system; the outer cylindrical contour data comprises a highest contour point, a lowest contour point, and consecutive contour points between the highest contour point and the lowest contour point, wherein the highest contour point corresponds to a maximum radius value, and the lowest contour point corresponds to a minimum radius value;

the control system is configured to determine a machining voltage value output by the power source when each contour point of the anode workpiece rotates to a machining area;

during rotating pulse dynamic electrochemical machining, the cathode tool rotates around a center point of the cathode tool at a constant angular velocity, and the anode workpiece rotates around a center point of the anode workpiece at the constant angular velocity; meanwhile, the cathode tool performs a feed movement at a set feed velocity along a line of centers of the cathode tool and the anode workpiece; the control system determines the machining voltage value output by the power source when each contour point of the anode workpiece rotates to the machining area to automatically change an applied voltage between the cathode tool and the anode workpiece; and the control system controls the power source to output a maximum voltage value when the highest contour point of the anode workpiece rotates to the machining area and controls the power source to output zero voltage value when the lowest contour point of the anode workpiece rotates to the machining area;

during rotating pulse dynamic electrochemical machining, the displacement sensor is configured to collect outer cylindrical contour data of the anode workpiece before the jth revolution of the anode workpiece; and the control system is configured to:

calculate a maximum roundness error based on the outer cylindrical contour data of the anode workpiece before the jth revolution of the anode workpiece;

determine whether the maximum roundness error is greater than a set tolerance value to obtain a determination result;

if the determination result indicates that the maximum roundness error is greater than a set tolerance value, calculate a machining voltage value output by the power source corresponding to each contour point during the jth revolution of the anode workpiece based on the maximum roundness error, update the maximum roundness error in the step of determining whether the maximum roundness error is greater than a set tolerance value to obtain a determination result to a maximum roundness error corresponding to the (j+1)th revolution, and return to the step of determining whether the maximum roundness error is greater than a set tolerance value to obtain a determination result; and if the determination result indicates that the maximum roundness error is less than or equal to the set tolerance value, control the power source to output a constant machining voltage value.

2. The pulse dynamic electrochemical machining apparatus for rapidly leveling a surface of a revolving part according to claim 1, wherein, during calculating a maximum roundness error based on the outer cylindrical contour data of the anode workpiece before the jth revolution of the anode workpiece, the control system is specifically configured to:

determine a maximum radius value and a minimum radius value in the outer cylindrical contour data of the anode workpiece before the jth revolution of the anode workpiece; and calculate a difference between the maximum radius value and the minimum radius value and determine the difference as the maximum roundness error.

3. The pulse dynamic electrochemical machining apparatus for rapidly leveling a surface of a revolving part according to claim 1, wherein, during calculating a machining voltage value output by the power source corresponding to each contour point during the jth revolution of the anode workpiece based on the maximum roundness error, the control system is specifically configured to:

calculate a machining voltage value output by the power source corresponding to the ith contour point during the jth revolution of the anode workpiece by $$U_{ji} = \frac{\delta_{ji}}{\delta_{maxj}} U_{maxj},$$

wherein $U_{ji}$ represents a machining voltage value when the ith contour point of the anode workpiece rotates to the machining area during the jth revolution of the anode workpiece; $\delta_{ji}$ represents a radius difference between the ith contour point of the anode workpiece and the lowest contour point of the anode workpiece during the jth revolution of the anode workpiece; $\delta_{maxj}$ represents the maximum roundness error of the outer cylindrical contour of the anode workpiece during the jth revolution of the anode workpiece; and $U_{maxj}$ represents a maximum machining voltage applied to the anode workpiece during the jth revolution of the anode workpiece.

4. The pulse dynamic electrochemical machining apparatus for rapidly leveling a surface of a revolving part according to claim 1, wherein, the machining voltage value corresponding to the highest contour point of the anode workpiece gradually decreases with an increasing number of revolutions of the anode workpiece.

5. The pulse dynamic electrochemical machining apparatus for rapidly leveling a surface of a revolving part according to claim 1, further comprising an oscilloscope, wherein the oscilloscope is connected to the displacement sensor; and the oscilloscope is configured to acquire the outer cylindrical contour data of the anode workpiece collected by the displacement sensor and display the acquired data in a graphic form;

the cathode tool has a revolving part structure; and the anode workpiece has a revolving part structure.

6. The pulse dynamic electrochemical machining apparatus for rapidly leveling a surface of a revolving part according to claim 1, further comprising an electrolyte tank, wherein the cathode tool and the anode workpiece are both immersed in the electrolyte tank for electrochemical machining; and the displacement sensor is installed on one side of the electrolyte tank and close to the anode workpiece.

7. A pulse dynamic electrochemical machining method for rapidly leveling a surface of a revolving part using the pulse dynamic electrochemical machining apparatus for rapidly leveling a surface of a revolving part according to claim 1, the pulse dynamic electrochemical machining method comprises the following steps:

during rotating pulse dynamic electrochemical machining, collecting outer cylindrical contour data of the anode workpiece before the jth revolution of the anode workpiece;

calculating a maximum roundness error based on the outer cylindrical contour data of the anode workpiece before the jth revolution of the anode workpiece;

determining whether the maximum roundness error is greater than a set tolerance value to obtain a determination result;

if the determination result indicates that the maximum roundness error is greater than a set tolerance value, calculating a machining voltage value output by the power source corresponding to each contour point during the jth revolution of the anode workpiece based on the maximum roundness error, updating the maximum roundness error in the step of determining whether the maximum roundness error is greater than a set tolerance value to obtain a determination result to a maximum roundness error corresponding to the (j+1)th revolution, and returning to the step of determining whether the maximum roundness error is greater than a set tolerance value to obtain a determination result; and if the determination result indicates that the maximum roundness error is less than or equal to the set tolerance value, controlling the power source to output a constant machining voltage value.

8. The pulse dynamic electrochemical machining method for rapidly leveling a surface of a revolving part according to claim 7, wherein, during calculating a maximum roundness error based on the outer cylindrical contour data of the anode workpiece before the jth revolution of the anode workpiece, the control system is specifically configured to:

determine a maximum radius value and a minimum radius value in the outer cylindrical contour data of the anode workpiece before the jth revolution of the anode workpiece; and calculate a difference between the maximum radius value and the minimum radius value and determine the difference as the maximum roundness error.

9. The pulse dynamic electrochemical machining method for rapidly leveling a surface of a revolving part according to claim 7, wherein, during calculating a machining voltage value output by the power source corresponding to each contour point during the jth revolution of the anode workpiece based on the maximum roundness error, the control system is specifically configured to:

calculate a machining voltage value output by the power source corresponding to the ith contour point during the jth revolution of the anode workpiece by $$U_{ji} = \frac{\delta_{ji}}{\delta_{maxj}} U_{maxj},$$

wherein $U_{ji}$ represents a machining voltage value when the ith contour point of the anode workpiece rotates to the machining area during the jth revolution of the anode workpiece; $\delta_{ji}$ represents a radius difference between the ith contour point of the anode workpiece and the lowest contour point of the anode workpiece during the jth revolution of the anode workpiece; $\delta_{maxj}$ represents the maximum roundness error of the outer cylindrical contour of the anode workpiece during the jth revolution of the anode workpiece; and $U_{maxj}$ represents a maximum machining voltage applied to the anode workpiece during the jth revolution of the anode workpiece.

10. The pulse dynamic electrochemical machining method for rapidly leveling a surface of a revolving part according to claim 7, wherein, the machining voltage value corresponding to the highest contour point of the anode workpiece gradually decreases with an increasing number of revolutions of the anode workpiece.

11. The pulse dynamic electrochemical machining method for rapidly leveling a surface of a revolving part according to claim 7, further comprising an oscilloscope, wherein the oscilloscope is connected to the displacement sensor; and the oscilloscope is configured to acquire the outer cylindrical contour data of the anode workpiece collected by the displacement sensor and display the acquired data in a graphic form;

the cathode tool has a revolving part structure; and the anode workpiece has a revolving part structure.

12. The pulse dynamic electrochemical machining method for rapidly leveling a surface of a revolving part according to claim 7, further comprising an electrolyte tank, wherein the cathode tool and the anode workpiece are both immersed in the electrolyte tank for electrochemical machining; and the displacement sensor is installed on one side of the electrolyte tank and close to the anode workpiece.

13. The pulse dynamic electrochemical machining method for rapidly leveling a surface of a revolving part according to claim 7, wherein the calculating a maximum roundness error based on the outer cylindrical contour data of the anode workpiece before the jth revolution of the anode workpiece specifically comprises:

determining a maximum radius value and a minimum radius value in the outer cylindrical contour data of the anode workpiece before the jth revolution of the anode workpiece; and calculating a difference between the maximum radius value and the minimum radius value and determining the difference as the maximum roundness error.

14. The pulse dynamic electrochemical machining method for rapidly leveling a surface of a revolving part according to claim 8, wherein the calculating a maximum roundness error based on the outer cylindrical contour data of the anode workpiece before the jth revolution of the anode workpiece specifically comprises:

determining a maximum radius value and a minimum radius value in the outer cylindrical contour data of the anode workpiece before the jth revolution of the anode workpiece; and calculating a difference between the maximum radius value and the minimum radius value and determining the difference as the maximum roundness error.

15. The pulse dynamic electrochemical machining method for rapidly leveling a surface of a revolving part according to claim 9, wherein the calculating a maximum roundness error based on the outer cylindrical contour data of the anode workpiece before the jth revolution of the anode workpiece specifically comprises:

determining a maximum radius value and a minimum radius value in the outer cylindrical contour data of the anode workpiece before the jth revolution of the anode workpiece; and calculating a difference between the maximum radius value and the minimum radius value and determining the difference as the maximum roundness error.

16. The pulse dynamic electrochemical machining method for rapidly leveling a surface of a revolving part according to claim 10, wherein the calculating a maximum roundness error based on the outer cylindrical contour data of the anode workpiece before the jth revolution of the anode workpiece specifically comprises:

determining a maximum radius value and a minimum radius value in the outer cylindrical contour data of the anode workpiece before the jth revolution of the anode workpiece; and calculating a difference between the maximum radius value and the minimum radius value and determining the difference as the maximum roundness error.

17. The pulse dynamic electrochemical machining method for rapidly leveling a surface of a revolving part according to claim 11, wherein the calculating a maximum roundness error based on the outer cylindrical contour data of the anode workpiece before the jth revolution of the anode workpiece specifically comprises:

determining a maximum radius value and a minimum radius value in the outer cylindrical contour data of the anode workpiece before the jth revolution of the anode workpiece; and calculating a difference between the maximum radius value and the minimum radius value and determining the difference as the maximum roundness error.

18. The pulse dynamic electrochemical machining method for rapidly leveling a surface of a revolving part according to claim 12, wherein the calculating a maximum roundness error based on the outer cylindrical contour data of the anode workpiece before the jth revolution of the anode workpiece specifically comprises:

determining a maximum radius value and a minimum radius value in the outer cylindrical contour data of the anode workpiece before the jth revolution of the anode workpiece; and calculating a difference between the maximum radius value and the minimum radius value and determining the difference as the maximum roundness error.

19. The pulse dynamic electrochemical machining method for rapidly leveling a surface of a revolving part according to claim 7, wherein the calculating a machining voltage value output by the power source corresponding to each contour point during the jth revolution of the anode workpiece based on the maximum roundness error specifically comprises:

calculating a machining voltage value output by the power source corresponding to the ith contour point during the jth revolution of the anode workpiece by $$U_{ji} = \frac{\delta_{ji}}{\delta_{maxj}} U_{maxj},$$

wherein $U_{ji}$ represents a machining voltage value when the ith contour point of the anode workpiece rotates to the machining area during the jth revolution of the anode workpiece; $\delta_{ji}$ represents a radius difference between the ith contour point of the anode workpiece and the lowest contour point of the anode workpiece during the jth revolution of the anode workpiece; $\delta_{maxj}$ represents the maximum roundness error of the outer cylindrical contour of the anode workpiece during the jth revolution of the anode workpiece; and $U_{maxj}$ represents a maximum machining voltage applied to the anode workpiece during the jth revolution of the anode workpiece.

20. The pulse dynamic electrochemical machining method for rapidly leveling a surface of a revolving part according to claim 8, wherein the calculating a machining voltage value output by the power source corresponding to each contour point during the jth revolution of the anode workpiece based on the maximum roundness error specifically comprises:

calculating a machining voltage value output by the power source corresponding to the ith contour point during the jth revolution of the anode workpiece by $$U_{ji} = \frac{\delta_{ji}}{\delta_{maxj}} U_{maxj},$$

wherein $U_{ji}$ represents a machining voltage value when the ith contour point of the anode workpiece rotates to the machining area during the jth revolution of the anode workpiece; $\delta_{ji}$ represents a radius difference between the ith contour point of the anode workpiece and the lowest contour point of the anode workpiece during the jth revolution of the anode workpiece; $\delta_{maxj}$ represents the maximum roundness error of the outer cylindrical contour of the anode workpiece during the jth revolution of the anode workpiece; and $U_{maxj}$ represents a maximum machining voltage applied to the anode workpiece during the jth revolution of the anode workpiece.

\* \* \* \* \*